Sept. 13, 1955 J. O. EMMERSON 2,717,653
OSCILLATION LIMITING MECHANISM FOR A HELICOPTER ROTOR
Filed March 10, 1951
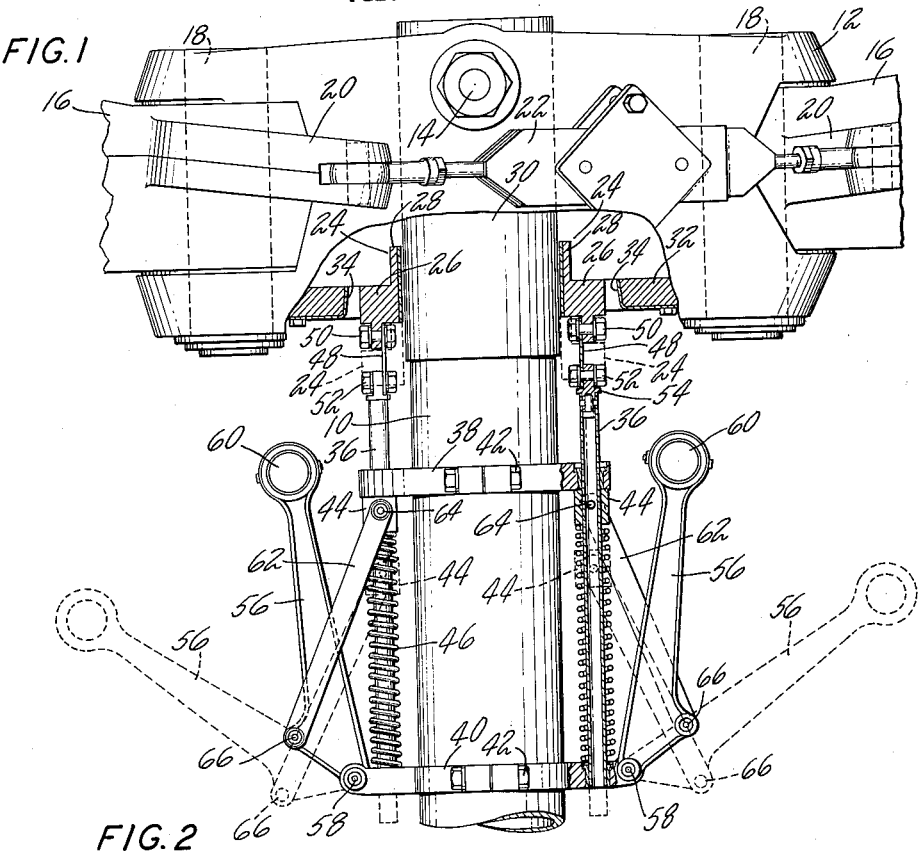
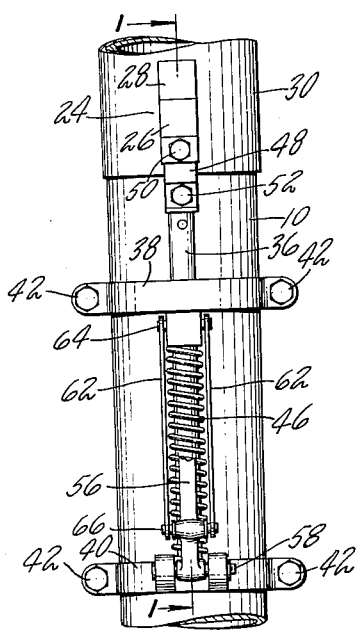
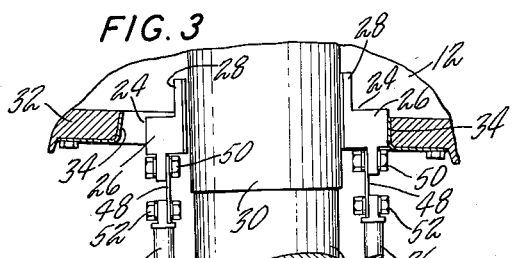
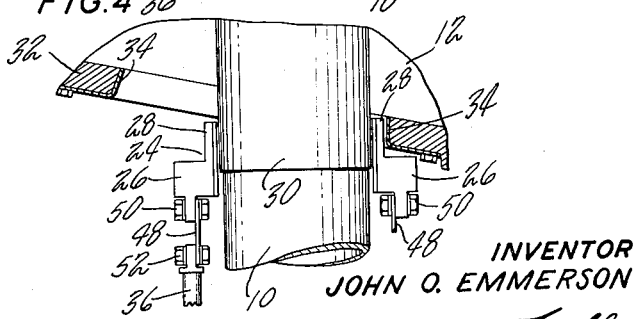
INVENTOR
JOHN O. EMMERSON
BY S. Jay Teller
ATTORNEY United States Patent Office 2,717,653
Patented Sept. 13, 1955

2,717,653

OSCILLATION LIMITING MECHANISM FOR A HELICOPTER ROTOR

John O. Emmerson, Granby, Conn., assignor to The Kaman Aircraft Corporation, Windsor Locks, Conn., a corporation of Connecticut Application March 10, 1951, Serial No. 214,933

13 Claims. (Cl. 170—160.55)

The invention relates to a helicopter of the type wherein the rotor is connected to a substantially vertical rotatable shaft for oscillation about an axis perpendicular to the shaft axis, and it relates more particularly to a mechanism automatically operable for limiting the oscillation of the rotor under certain conditions.

The invention is or may be of general utility, but it is particularly adapted for a helicopter such as that disclosed in the copending application of Charles H. Kaman and Martin L. Stevens, Serial No. 115,749 filed September 14, 1949, for Control System for Multiple Rotor Helicopter, now Patent No. 2,695,674. A helicopter as disclosed in the said application comprises two substantially vertical but diverging main shafts which are spaced apart transversely and it comprises two rotors connected respectively with the two shafts for oscillation about axes perpendicular to the shaft axes. The two shafts are connected for rotation in unison and in opposite directions, and the rotors are so connected with the shafts that the blades of the respective rotors intermesh during rotation so as to avoid interference with each other.

When the rotors are rotating at speeds equal to or exceeding a predetermined critical speed and more particularly at speeds suitable for flight, they are controlled by aerodynamic forces in such a manner that they move in planes perpendicular to their shafts or in such a manner that they are symmetrically oscillated cyclically about their respective pivotal axes so as to avoid any possible engagement of the blades of one rotor with those of the other. However, at lower idling speeds with the helicopter on the ground the normal aerodynamic forces acting on the rotors are less dependable and are inadequate. The rotors may then be unpredictably tilted or oscillated unsymmetrically about their pivotal axes, as for instance by sudden gusts of wind. Such unpredictable tilting or oscillation of one or both rotors might cause a blade of one rotor to engage a blade of the other rotor with disastrous results.

The general object of the present invention is to provide a means which automatically serves to narrowly limit tilting or oscillation of each rotor with respect to its shaft when the speed of rotation is below a predetermined critical speed and which automatically serves to permit tilting or oscillation to a greater extent when the speed of rotation is equal to or exceeds the said predetermined critical speed. The amplitude of flapping or oscillation during flight may be on the order of plus or minus 12° in any azimuth direction, but to guard against possible blade interference at idling speeds on the ground the amplitude of flapping must be limited to about plus or minus 4° or even less. The critical speed below which it is necessary to narrowly limit rotor oscillation may widely vary, but it is less than the minimum speed necessary for flight and it may be about 120 R. P. M.

Other objects of the invention are to provide various features of mechanical structure and arrangement for effecting the aforesaid general object.

Still other objects will be apparent from the drawing and from the following description and claims.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a front view of an oscillation limiting mechanism embodying the invention, some of the parts at the right being shown in section along the line 1—1 of Fig. 2.

Fig. 2 is a right side view of some of the parts shown in Fig. 1.

Fig. 3 is a view similar to a portion of Fig. 1, but showing the rotor hub member in a tilted position.

Fig. 4 is a view similar to Fig. 3, but showing the stop means in a different position and showing the rotor hub member tilted to a greater extent.

The drawing shows only one of the two main shafts together with a portion of the hub structure of the corresponding rotor together with the corresponding oscillation limiting mechanism. For convenience the shaft is shown with its axis vertical and not tilted. Various features of the hub structure and of the rotor are omitted, reference being made to the aforesaid Kaman and Stevens application for details not herein disclosed.

The rotatable main shaft is shown at 10 and for convenience of illustration the said shaft is shown as exactly vertical although it is ordinarily inclined. The rotor of the helicopter includes a main hub member 12 which is connected with the upper portion of the main shaft 10 by means of a pivot pin 14 extending through suitable apertures in the shaft walls. Suitable bearings, not shown, are interposed between the hub member 12 and the pivot pin 14. The pivot pin serves to connect the hub member with the shaft for pivotal movement or oscillation about an axis fixed with respect to the shaft and perpendicular to the axis thereof.

Two blade supports 16, 16 are provided at the ends of the main hub member 12, these blade supports being connected with the said hub member for pivotal movements about vertical drag axes by means of pivot pins 18, 18 together with suitable bearings which are not shown. Oppositely disposed and oppositely extending blades, not shown, are carried respectively by the said blade supports 16, 16. Each blade support 16 is provided with two laterally extending arms 20, 20, only one arm for each blade support being shown in the drawing. In order that the two blade supports and the blades carried thereby may move to substantially the same extents about their respective drag axes, the arms 20 of one blade support are connected with the arms 20 of the other blade support by means of two links 22, only one of which is shown in the drawing. Preferably, the pivotal axis at 14 is located at an angle of approximately 60° with respect to the longitudinal lines of the blades carried by the blade supports 16, 16.

As previously stated, means is provided for limiting the extent of tilting or oscillation of the rotor with respect to the shaft when the speed of rotation is below a predetermined critical speed, the said means automatically serving to permit tilting or oscillation to a greater extent when the speed of rotation equals or exceeds the said critical speed. As to details, the oscillation limiting means may be widely varied, but as shown it comprises a stop means rotatable with the shaft 10 and also movable relatively thereto in a generally vertical direction. The stop means is preferably movable vertically and rectilinearly and it preferably comprises two vertically movable separate stop blocks 24, 24. The said stop blocks are at opposite sides of the shaft 10, being symmetrically disposed with respect to the axis at 14. Preferably each stop block 24 has a relatively thick lower portion 26 and has a relatively thin upper portion 28 which extends upwardly beyond the said relatively thick lower portion 26. The thicker lower portions 26, 26 of the two stop blocks constituting the stop means have widely spaced vertical abutment faces and the thinner upper portions 28, 28 of the said two stop blocks have less widely spaced vertical abutment faces. As shown, the upper portion of the shaft 10 is provided with a sleeve 30 and the stop blocks engage the said sleeve and do not directly engage the said shaft. The sleeve may be regarded as a part of the shaft and the word "shaft" will sometimes be used to also include the sleeve.

The hub member 12 comprises two bumpers which are at opposite sides of the shaft and at opposite sides of the pivotal axis at 14 and which are spaced vertically from a horizontal plane extending through the said axis, the said bumpers being preferably below the said plane. As shown, the hub member has a transverse flange 32 at the lower portion thereof, the said flange having a large central opening therein and the said bumpers being at opposite edges of the opening. Preferably, the bumpers include separate bumper members 34, 34 secured to the flange 32 at opposite sides of the said opening therein, the said bumpers having walls which face toward the shaft. The bumper members 34, 34 are formed of a metal harder than that of the main hub member and they prevent any possible crushing of the softer metal of the hub member. When the two stop blocks 24, 24 constituting the stop means are in their upper positions as shown by full lines in Fig. 1, their thicker lower portions 26, 26 are located within the opening in the flange 32 of the hub member 12. The said lower block portions 26, 26 are located respectively between the walls of the two bumpers and the adjacent peripheral vertical portions of the shaft 10. The abutment faces of the said lower portions of the stop blocks are spaced from the bumpers to small extents when the hub member is horizontal.

A supporting and guiding means is provided for the stop blocks 24, 24, this means being carried by the shaft 10 and being rotatable therewith and vertically movable relatively thereto. The said supporting means preferably comprises two vertically movable guides or rods 36, 36 supported on and rotatable with the shaft. The rods 36, 36 are preferably tubular to reduce weight. The stop blocks 24, 24 are preferably vertically movable independently of each other, and the guide rods are preferably also vertically movable independently of each other, the said blocks being carried respectively by the said rods.

For supporting and guiding the rods 36, 36 two similar upper and lower supporting members 38 and 40 are provided. Each of these members comprises two parts which are connected with each other by bolts 42, 42. By means of the bolts the two parts of each supporting member are connected with each other and the said members are clamped in fixed positions on the shaft 10. The said supporting members 38 and 40 are provided with vertical apertures in which are located bearing bushings for guiding the rods 36, 36. Blocks 44, 44 are secured respectively to the rods 36, 36, these blocks being below the upper supporting member 38 and being in engagement with the said member when the rods and the stop blocks are in their upper positions as shown. A spring means is provided for biasing the rods 36, 36 and the blocks 24, 24 toward their said upper positions, and as shown the said spring means comprises two coil springs 46, 46 which repectively surround the rods 36, 36. The springs respectively abut at their upper ends against the blocks 44, 44 and they abut at their lower ends against the lower supporting member 40.

Preferably the stop blocks 24, 24 are movable horizontally to slight extents with respect to the rods 36, 36.

Preferably the blocks are connected with the rods by means of leaf springs 48, 48 which permit horizontal movements to the said slight extents. As shown, the upper end of each leaf spring 48 is connected with the corresponding block 24 by means of a bolt 50 and the lower end of each spring 48 is connected by means of a bolt 52 with a member 54 secured to the upper end of the corresponding rod 36.

A centrifugal means is provided for moving the stop means in opposition to the spring means out of its said position wherein it narrowly limits oscillation of the rotor, the said centrifugal means being operative whenever the speed of rotation equals or exceeds the said predetermined critical speed. Preferably and as shown, the centrifugal means comprises two centrifugal members or arms 56, 56 which are connected with one supporting member, as for instance the lower supporting member 40, for pivotal movement about aparallel horizontal axes at 58, 58. The arms 56, 56 include centrifugal weights 60, 60 adjacent their upper ends. With the parts in the positions shown in Fig. 1 the arms 56, 56 are substantially upright, being inclined slightly outwardly. The arms 56, 56 are connected respectively with the rods 36, 36 by means of pairs of links 62, 62. The links are pivotally connected at their upper ends with the blocks 44, 44 at 64, 64 and the links are pivotally connected at their lower ends with the arms 56, 56 at 66, 66.

Figs. 1 and 2 show the various parts in the relative positions which they occupy when the shaft and the rotor are stationary or are rotating at a speed less than the said predetermined critical speed. The springs 46, 46 hold the rods 36, 36 and the stop blocks 24, 24 in their uppermost positions wherein they narrowly limit oscillation of the rotor. The relatively thick portions 26, 26 of the stop blocks are so positioned that their widely spaced abutment faces are adapted to be engaged by the bumpers 34, 34 on the main hub member 12. The hub member and the rotor can oscillate only to the limited extent shown in Fig. 3 with one bumper 34 engaging the abutment face of the portion 26 of one stop block. When there are two shafts and two rotors as disclosed in the said Kaman application, the limited extent of tilting or oscillation permitted by the stop blocks is so small that the blades of one rotor cannot under any circumstances engage the blades of the other rotor.

It has been pointed out that the springs 48, 48 permit limited horizontal movements of the stop blocks 24, 24 with respect to the rods 36, 36. When the stop blocks are free from engagement with either bumper as shown in Fig. 1, the stop blocks are preferably spaced outwardly to a small extent from the sleeve 30 on the shaft 10, such spacing being somewhat exaggerated in the drawing. This small spacing avoids static or sliding friction between the stop blocks and the shaft sleeve, it being obvious that any such friction would resist the action of the centrifugal means and would thus make the said action less dependable. When one of the stop blocks is engaged by one of the bumpers as shown in Fig. 3, the stop block is moved horizontally to whatever slight extent is necessary for firm engagement with the sleeve 30. The springs 48, 48 prevent the transmission to the rods 36, 36 of any substantial shocks resulting from the engagement of the bumpers with the stop blocks.

When the main shaft and the rotor are rotated at the predetermined critical speed or at any higher speed, the rotating centrifugal arms 56, 56 move outwardly by centrifugal action to the positions shown by dotted lines in Fig. 1. As the arms 56, 56 so move, they serve by means of the links 62, 62 to move the rods 36, 36 and the stop blocks 24, 24 downwardly to the positions shown by dotted lines. The centrifugal arms hold the stop blocks in their lower positions so long as the higher speed of rotation is maintained.

The geometrical disposition of the several pivotal axes is such that the relationship between the upward forces applied by the springs 46, 46 and the downward forces resulting from the centrifugal action of the arms 56, 56 enables the parts to move quickly to the dotted line positions whenever the critical speed is reached. The links 62, 62 and the blocks 44, 44 constitute parts of two connections engaging respectively with the springs 46, 46 and with the arms 56, 56 between the ends of the latter so as to initially transmit force from the springs to the arms at acute angles to the lengths of the latter and in directions to resist outward movements of the arms under said centrifugal action. As soon as the arms 56, 56 start to move outwardly centrifugally in opposition to the spring forces transmitted at said acute angles, the centrifugal forces increase more rapidly than do the transmitted spring forces, the result being that the arms 56, 56 move immediately to their extreme outer positions without any additional increase in the speed of rotation. This is important as it prevents the bumpers from repeatedly striking the abutment faces of the lower portions of the stop blocks with the blocks in intermediate positions.

The lower positions of the stop blocks are more clearly shown in Fig. 4. It will be seen that when the stop blocks are in their said lower positions, the abutment faces of the thicker lower portions 26, 26 thereof are out of the paths of movement of the bumpers 34, 34. The hub member and the rotor are free to oscillate under the control of aerodynamic forces to a substantially greater extent as indicated. The maximum extent of normal oscillation is substantialy that indicated in Fig. 4 and the bumpers 34, 34 do not normally engage the abutment faces of the relatively thin portions 28, 28 of the stop blocks. However, the abutment faces of the said portions 28, 28 of the stop blocks are in the paths of movement of the bumpers and are adapted to definitely prevent oscillation beyond a predetermined maximum extent.

When the speed of rotation is reduced so that it reaches and passes a critical speed, the springs 46, 46 overcome the centrifugal action of the arms 56, 56, the various parts being then automatically returned quickly to the relative positions shown in Figs. 1 and 2. As soon as the centrifugal arms start to move inwardly the centrifugal force decreases more rapidly than does the pressure applied by the springs 46, 46, the result being that the centrifugal arms move immediately to their extreme inner positions without any additional decrease in the speed of rotation. This is important as it prevents the bumpers from repeatedly striking the abutment faces of the lower portions of the stop blocks with the blocks in intermediate positions.

When the stop blocks tend to return to the positions shown in Figs. 1 and 2, it may sometimes happen that the rotor and the hub member are momentarily tilted to such an extent that one of the stop blocks engages the bottom of the rotor hub member and is prevented from immediately moving to its uppermost position. The two stop blocks are independently movable and in any event one of them will immediately move to its uppermost position. The other stop block will move to its uppermost position as soon as the oscillating hub member has swung sufficiently to permit the said block to so move.

The invention claimed is:

1. In an oscillation limiting mechanism for the rotor of a helicopter, the combination of a substantially vertical rotatable main shaft, a rotor having a hub member pivotally connected with the shaft for oscillation about an axis perpendicular to the axis of rotation thereof which hub member is provided with bumpers located at opposite sides of the shaft and having walls facing toward it, the said bumpers being spaced vertically from a horizontal plane extending through the said axis of oscillation, a stop means rotatable with the shaft and having two portions at opposite sides of the shaft which stop means is also movable relatively to the shaft in a generally vertical direction into and out of an oscillation limiting position wherein said two portions thereof are located respectively between the said walls of the two bumpers and the peripheral vertical portions of the shaft, the said stop means when in the last said position being engageable by the bumpers at the said walls thereof to narrowly limit the said oscillation of the rotor, spring means for biasing the said stop means for movement to its said oscillation limiting position, and centrifugally acting means rotatable with the shaft and operatively connected with the stop means for moving the latter out of and for holding it out of its said oscillation limiting position whenever the speed of rotation equals or exceeds a predetermined critical speed.

2. An oscillation limiting mechanism as set forth in claim 1, wherein the bumpers are spaced downwardly from the said plane extending through the axis of oscillation, wherein the spring means biases the stop means for upward movement to its oscillation limiting position, and wherein the centrifugally acting means moves the stop means downwardly out of its said oscillation limiting position.

3. In an oscillation limiting mechanism for the rotor of a helicopter, the combination of a substantially vertical rotatable main shaft, a rotor having a hub member pivotally connected with the shaft for oscillation about an axis perpendicular to the axis of rotation thereof which hub member is provided with bumpers located at opposite sides of the shaft and having walls facing toward it, the said bumpers being spaced vertically from a horizontal plane extending through the said axis of oscillation, a stop means carried by the shaft and rotatable therewith and having two portions at opposite sides of the shaft which stop means is also rectilinearly movable relatively to the shaft in a vertical direction into and out of an oscillation limiting position wherein said two portions thereof are located respectively between the said walls of the two bumpers and the peripheral vertical portions of the shaft, the said stop means when in the last said position being engageable by the bumpers at the said walls thereof to narrowly limit the said oscillation of the rotor, spring means carried by the shaft for biasing the stop means for rectilinear vertical movement to its said oscillation limiting position, and centrifugally acting means carried by the shaft and rotatable therewith which means is operatively connected with the stop means for rectilinearly moving it vertically out of and for holding it out of its said oscillation limiting position whenever the speed of rotation equals or exceeds a predetermined critical speed.

4. In an oscillation limiting mechanism for the rotor of a helicopter, the combination of a substantially vertical rotatable main shaft, a rotor having a hub member pivotally connected with the shaft for oscillation about an axis perpendicular to the axis of rotation thereof which hub member is provided with bumpers located at opposite sides of the shaft and having walls facing toward it, the said bumpers being spaced vertically from a horizontal plane extending through the said axis of oscillation, two stop blocks at opposite sides of the shaft and rotatable therewith which stop blocks are also movable relatively to the shaft in generally vertical directions into and out of oscillation limiting positions wherein they are located respectively between the said walls of the two bumpers and the peripheral vertical portions of the shaft for narrowly limiting said oscillation of the rotor, two similar arms pivotally movable about parallel horizontal axes at opposite sides of the shaft which arms have weights at their free ends, means connecting the arms respectively with the bumpers for moving the bumpers generally vertically and out of oscillation limiting positions when the arms are moved outwardly by centrifugal action of the weights, two springs at opposite sides of the shaft, and two connections engaging respectively with the springs and with the arms between the ends of the latter so as to initially transmit force from the springs to the arms at acute angles to the lengths of said levers and in the directions to resist outward movements of the arms under said centrifugal action.

5. In an oscillation limiting mechanism for the rotor of a helicopter, the combination of a substantially vertical rotatable main shaft, a rotor having a hub member pivotally connected with the shaft for oscillation about an axis perpendicular to the axis of rotation thereof which hub member is provided with bumpers located at opposite sides of the shaft and having walls facing toward it, the said bumpers being spaced downwardly from a horizontal plane extending through the said axis of oscillation, a stop means carried by the shaft and rotatable therewith and also relatively movable upwardly and downwardly between upper and lower oscillation limiting positions, the said stop means having portions which in each said position are respectively between the said walls of the two bumpers and the shaft which portions have lower relatively widely spaced abutment faces engageable with the walls of the bumpers to narrowly limit oscillation of the rotor when the stop means is in its said upper position and which portions have upper less widely spaced abutment faces engageable with the walls of the bumpers to less narrowly limit oscillation of the rotor when the stop means is in its said lower position, spring means for biasing the stop means for movement to its said upper oscillation limiting position, and centrifugally acting means rotatable with the shaft and operatively connected with the stop means for moving it to and for holding it in its said lower oscillation limiting position whenever the speed of rotation equals or exceeds a predetermined critical speed.

6. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, guide means carried by the shaft and rotatable therewith and vertically movable relatively thereto, two separate oppositely disposed stop blocks immediately adjacent the shaft, two springs respectively connecting the stop blocks with the guide means for vertical movement therewith into and out of positions between the shaft and the respective bumpers wherein they are engageable with the said bumpers to narrowly limit the said oscillation of the rotor, the said springs normally holding the said stop blocks out of engagement with the shaft but nevertheless enabling them to move inwardly relatively to the guide means to engage the shaft, spring means carried by the shaft for biasing the guide means and the stop blocks for vertical movement to locate the said stop blocks in their said oscillation limiting positions, and centrifugally acting means carried by the shaft and rotatable therewith which centrifugally acting means is operatively connected with the guide means and the stop blocks for moving them vertically so as to move the stop blocks out of and for holding them out of their said oscillation limiting positions whenever the speed of rotation equals or exceeds a predetermined critical speed.

7. In an oscillation limiting mechanism for the rotor of a helicopter, the combination of a substantially vertical rotatable main shaft, a rotor having a hub member pivotally connected with the shaft for oscillation about an axis perpendicular to the axis of said shaft, the said hub member having bumpers at opposite sides of the shaft and at opposite sides of and spaced vertically from a horizontal plane extending through the said axis of oscillation, two oppositely disposed rods carried by the shaft and guided for vertical movement, two oppositely disposed stop blocks carried respectively by the said rods for vertical movement between upper and lower oscillation limiting positions, the said stop blocks having lower relatively widely spaced abutment faces engageable with the bumpers to narrowly limit oscillation of the rotor when the blocks are in their said upper positions and the said stop blocks having upper less widely spaced abutment faces engageable with the bumpers to less narrowly limit oscillation of the rotor when the blocks are in their said lower positions, spring means for biasing the said rods for vertical movement so as to move the said stop blocks to their said upper oscillation limiting positions, and centrifugally acting means carried by the shaft and rotatable therewith which means is operatively connected with the said rods and serves whenever the speed of rotation equals or exceeds a predetermined critical speed to move the said rods vertically to and to hold them in positions wherein the said stop blocks are in their said lower oscillation limiting positions.

8. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, a plurality of rods carried by the shaft and guided for vertical movement, a stop means connected with the rods for vertical movement therewith into and out of a position wherein two portions thereof are respectively between the said bumpers and the said shaft, the said portions of the stop means being engageable with the bumpers to narrowly limit the said oscillation of the rotor, a plurality of coil springs respectively surrounding the said rods for biasing them for vertical movement so as to thereby vertically move the stop means to its said oscillation limiting position, and centrifugally acting means carried by the shaft and rotatable therewith which means is operatively connected with the said rods and serves whenever the speed of rotation equals or exceeds a predetermined critical speed to move the said rods vertically to and to hold them in positions wherein the said stop means is out of its said oscillation limiting position.

9. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, two vertically spaced supports secured to the shaft, a plurality of rods carried by the said supports and guided thereby for vertical movement, a stop means connected with the rods for vertical movement therewith into and out of a position wherein two portions thereof are respectively between the said bumpers and the said shaft, the said portions of the stop means being engageable with the bumpers to narrowly limit the said oscillation of the rotor, a plurality of coil springs respectively surrounding the said rods between the said supports for biasing the said rods for vertical movement so as to thereby vertically move the stop means to its said oscillation limiting position, a plurality of links each pivotally connected at one end with one of the said rods, and a plurality of centrifugal arms pivoted to one of the supports for movement about horizontal axes and each pivotally connected with the opposite end of a corresponding link, the said arms swinging outwardly when the speed of rotation equals or exceeds a predetermined critical speed and therefore serving by means of the said links to vertically move the said rods to and to hold them in positions wherein the said stop means is out of its said oscillation limiting position.

10. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, two oppositely disposed rods carried by the shaft and guided for vertical movement, two oppositely disposed stop blocks carried respectively by the said rods for vertical movement therewith into and out of positions between the shaft and the respective bumpers wherein they are engageable with the said bumpers to narrowly limit the said oscillation of the rotor, two coil springs respectively surrounding the said rods for biasing them for vertical movement so as to thereby vertically move the stop blocks to their said oscillation limiting positions, and centrifugally acting means carried by the shaft and rotatable therewith which means is operatively connected with the said rods and serves whenever the speed of rotation equals or exceeds a predetermined critical speed to move the said rods vertically to and to hold them in positions wherein the said stop blocks are out of their said oscillation limiting positions.

11. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, two oppositely disposed rods carried by the shaft and guided for vertical movement, two oppositely disposed stop blocks immediately adjacent the shaft, two springs respectively connecting the said stop blocks with the said rods for vertical movement therewith into and out of positions between the shaft and the respective bumpers wherein they are engageable with the said bumpers to narrowly limit the said oscillation of the rotor, the said springs normally holding the said stop blocks out of engagement with the shaft but nevertheless enabling them to move inwardly relatively to the rods to engage the shaft, spring means for biasing the said rods for vertical movement so as to thereby vertically move the stop blocks to their said oscillation limiting positions, and centrifugally acting means carried by the shaft and rotatable therewith which means is operatively connected with the said rods and serves whenever the speed of rotation equals or exceeds a predetermined critical speed to move the said rods vertically to and to hold them in positions wherein the said stop blocks are out of their said oscillation limiting positions.

12. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, two oppositely disposed rods carried by the shaft and guided for vertical movement which rods are movable independently of each other, two oppositely disposed stop blocks carried respectively by the said rods for vertical movement therewith into and out of positions between the shaft and the respective bumpers wherein they are engageable with the said bumpers to narrowly limit the said oscillation of the rotor, two coil springs respectively surrounding the said rods for biasing them for independent vertical movements so as to thereby vertically move the stop blocks to their said oscillation limiting positions, and two centrifugally acting devices carried by the shaft and rotatable therewith which devices are operatively connected respectively with the said rods and serve whenever the speed of rotation equals or exceeds a predetermined critical speed to independently move the said rods vertically to and to hold them in positions wherein the said stop blocks are out of their said oscillation limiting positions.

13. In an oscillation limiting mechanism for the rotor of a helicopter, the combination of a substantially vertical rotatable main shaft, a rotor having a hub member pivotally connected with the shaft for oscillation about an axis perpendicular to the axis of the shaft, the said hub member having bumpers at opposite sides of the shaft and spaced vertically from a horizontal plane extending through the said axis of oscillation, two vertically spaced supports secured to the shaft, two rods carried by the said supports and guided thereby for independent vertical movement, two stop blocks connected respectively with the rods for vertical movement therewith into and out of positions between the shaft and the respective bumpers where they are engageable with the said bumpers to narrowly limit the said oscillation of the rotor, two coil springs respectively surrounding the said rods between the said supports for independently biasing the said rods for vertical movement so as to thereby vertically move the stop blocks to their said oscillation limiting positions, two links each pivotally connected at one end with one of the said rods, and two centrifugal arms pivoted to one of the supports for movement about horizontal axes and each pivotally connected with the opposite end of a corresponding link, the said arms swinging outwardly when the speed of rotation equals or exceeds a predetermined critical speed and therefore serving by means of the corresponding links to vertically move the corresponding rods to and to hold them in positions wherein the said stop blocks are out of their said oscillation limiting positions.

References Cited in the file of this patent

UNITED STATES PATENTS

| | | |
|---|---|---|
| 2,151,215 | Larsen | Mar. 21, 1939 |
| 2,396,038 | Bossi | May 5, 1946 |
| 2,465,674 | Crowell | Mar. 29, 1949 |
| 2,471,681 | Gluhareff | May 31, 1949 |
| 2,475,333 | Morris | July 5, 1949 |
| 2,481,747 | Hiller, Jr. | Sept. 13, 1949 |
| 2,614,640 | Buivid | Oct. 21, 1952 |

FOREIGN PATENTS

| | | |
|---|---|---|
| 64,262 | Netherlands | Oct. 15, 1949 |